(12) United States Patent
Yi et al.

(10) Patent No.: US 12,334,544 B2
(45) Date of Patent: Jun. 17, 2025

(54) NEGATIVE ELECTRODE MATERIAL AND ELECTROCHEMICAL APPARATUS AND ELECTRONIC APPARATUS CONTAINING THE NEGATIVE ELECTRODE MATERIAL

(71) Applicant: Ningde Amperex Technology Limited, Ningde (CN)

(72) Inventors: Ting Yi, Ningde (CN); Hang Cui, Ningde (CN); Yuansen Xie, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 771 days.

(21) Appl. No.: 17/512,053

(22) Filed: Oct. 27, 2021

(65) Prior Publication Data
US 2022/0052324 A1    Feb. 17, 2022

Related U.S. Application Data

(63) Continuation of application No. PCT/CN2019/121736, filed on Nov. 28, 2019.

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/483* (2013.01); *H01M 4/587* (2013.01); *H01M 4/622* (2013.01);
(Continued)

(58) Field of Classification Search
CPC ........ H01M 4/366; H01M 4/48; H01M 4/483; H01M 4/587; H01M 4/621; H01M 4/622;
(Continued)

(56) References Cited

U.S. PATENT DOCUMENTS 9,812,739 B2    11/2017  Kefei
10,263,279 B2    4/2019  Yushin et al.
(Continued)

FOREIGN PATENT DOCUMENTS

CN    101504980 A    8/2009
CN    102792493 A    11/2012
(Continued)

OTHER PUBLICATIONS

English translation of CN Publication 107046125, Aug. 2017.*
(Continued)

*Primary Examiner* — Brittany L Raymond
(74) *Attorney, Agent, or Firm* — XSENSUS LLP

(57) ABSTRACT

A negative electrode material of this application includes silicon-based particles, where the silicon-based particles include: a silicon oxide $SiO_x$, where x is 0.5 to 1.6; and a carbon layer, where the carbon layer covers at least a portion of a surface of the silicon oxide $SiO_x$. In a Raman spectrum, a ratio of a height $I_{1350}$ of the silicon-based particles at a peak of 1350 $cm^{-1}$ to a height $I_{1580}$ at a peak of 1580 $cm^{-1}$ satisfies $0<I_{1350}/I_{1580}<5$, and a ratio of a height $I_{510}$ at a peak of 510 $cm^{-1}$ to the height $I_{1350}$ at the peak of 1350 $cm^{-1}$ satisfies $0<I_{510}/I_{1350}<12$. A lithium ion battery prepared from the negative electrode active material has improved first efficiency, cycling performance, and rate performance.

18 Claims, 3 Drawing Sheets

Raman shift ($cm^{-1}$)

(51) Int. Cl.
  *H01M 4/48* (2010.01)
  *H01M 4/587* (2010.01)
  *H01M 4/62* (2006.01)
  *H01M 10/0525* (2010.01)

(52) U.S. Cl.
  CPC ....... *H01M 4/625* (2013.01); *H01M 10/0525* (2013.01); *H01M 2004/021* (2013.01); *H01M 2004/027* (2013.01)

(58) Field of Classification Search
  CPC ........... H01M 4/623; H01M 2004/021; H01M 2004/027
  See application file for complete search history.

(56) References Cited

U.S. PATENT DOCUMENTS

| | | | | |
|---|---|---|---|---|
| 2003/0215711 | A1* | 11/2003 | Aramata | H01M 4/625 252/502 |
| 2017/0110722 | A1 | 4/2017 | Lee et al. | |
| 2018/0198159 | A1* | 7/2018 | Azami | H01M 4/133 |

FOREIGN PATENT DOCUMENTS

| | | | |
|---|---|---|---|
| CN | 103081188 | A | 5/2013 |
| CN | 103094560 | A | 5/2013 |
| CN | 103618071 | A | 3/2014 |
| CN | 105981203 | A | 9/2016 |
| CN | 106463696 | A | 2/2017 |
| CN | 107046125 | * | 8/2017 |
| CN | 107046125 | A | 8/2017 |
| CN | 107710465 | A | 2/2018 |
| CN | 107845785 | A | 3/2018 |
| CN | 109524650 | A | 3/2019 |
| CN | 109616614 | A | 4/2019 |
| CN | 109841814 | A | 6/2019 |
| CN | 110034284 | A | 7/2019 |
| CN | 111162268 | A | 5/2020 |
| EP | 2869367 | A1 | 5/2015 |
| EP | 3965192 | A1 | 3/2022 |
| JP | 2012227154 | A | 11/2012 |
| JP | 2015043316 | A | 3/2015 |
| JP | 2016164870 | A | 9/2016 |
| JP | 2018147672 | A | 9/2018 |
| KR | 100794192 | * | 1/2008 |
| WO | 2019031597 | A1 | 2/2019 |

OTHER PUBLICATIONS

English translation of KR Publication 100794192, Jan. 2008.*
Extended European Search Report for EP application No. 19953982.6, dated May 2, 2022.
Notice of Reasons for Refusal, JP application No. 2021-517941, dated May 17, 2022.
Decision to Grant a Patent, JP application No. 2021-517941, dated Dec. 6, 2022.
Third Office Action of CN Application No. 201911198111.7, dated Aug. 25, 2021.
Notification to Grant Patent Right for Invention, CN Application No. 201911198111.7, dated Jan. 5, 2022.
ISR for International Application PCT-CN2019-121736 mailed Aug. 26, 2020.
Written Opinion for International Application PCT-CN2019-121736 mailed Aug. 26, 2020.
First Office Action for Counterpart Application No. CN201911198111.7 mailed Sep. 23, 2020.
Second Office Action for Counterpart Application No. CN201911198111.7 mailed Apr. 8, 2021.
Third Office Action for Counterpart Application No. CN201911198111.7 mailed Aug. 25, 2021.

* cited by examiner

NEGATIVE ELECTRODE MATERIAL AND ELECTROCHEMICAL APPARATUS AND ELECTRONIC APPARATUS CONTAINING THE NEGATIVE ELECTRODE MATERIAL

CROSS-REFERENCE TO THE RELATED APPLICATIONS

This application is a continuation of International Patent Application No. PCT/CN2019/121736 filed on Nov. 28, 2019, the disclosure of which is hereby incorporated by reference in its entirety.

TECHNICAL FIELD

This application relates to the field of energy storage, and specifically, to a negative electrode material and an electrochemical apparatus and an electronic apparatus containing the negative electrode material, particularly a lithium ion battery.

BACKGROUND

With popularity of consumer electronic products such as notebook computers, cell phones, tablet computers, portable power sources, and drones, requirements for electrochemical apparatuses therein are becoming increasingly stringent. For example, batteries are required to have a light weight, a high capacity, and a relatively long working life. Lithium ion batteries have dominated the market with their outstanding advantages such as high energy density, high safety, memory-free effect, and long working life.

SUMMARY

Embodiments of this application provide a negative electrode material and a method for preparing the negative electrode material, in an attempt to resolve at least one problem in the related field to a certain extent. The embodiments of this application further provide a negative electrode, an electrochemical apparatus, and an electronic apparatus that use the negative electrode material.

In an embodiment, this application provides a negative electrode material, where the negative electrode material includes silicon-based particles, and the silicon-based particles include:

a silicon oxide $SiO_x$, where x is 0.5 to 1.6; and
a carbon layer, where the carbon layer covers at least a portion of a surface of the silicon oxide $SiO_x$; and
in a Raman spectrum, a ratio of a height $I_{1350}$ of the silicon-based particles at a peak of approximately 1350 $cm^{-1}$ to a height $I_{1580}$ at a peak of approximately 1580 $cm^{-1}$ satisfies approximately $0 < I_{1350}/I_{1580} <$ approximately 5; and
a ratio of a height $I_{510}$ at a peak of approximately 510 $cm^{-1}$ to the height $I_{1350}$ at the peak of approximately 1350 $cm^{-1}$ satisfies approximately $0 < I_{510}/I_{1350} <$ approximately 12.

In another embodiment, this application provides a negative electrode, where the negative electrode includes a current collector and a coating on the current collector, and the coating includes:

silicon-based particles, where the silicon-based particles include:
a silicon oxide $SiO_x$, where x is 0.5 to 1.5; and
a carbon layer, where the carbon layer covers at least a portion of a surface of the silicon oxide $SiO_x$; and
in a Raman spectrum, a ratio of a height $I_{1350}$ of the silicon-based particles at a peak of approximately 1350 $cm^{-1}$ to a height $I_{1580}$ at a peak of approximately 1580 $cm^{-1}$ satisfies approximately $0 < I_{1350}/I_{1580} <$ approximately 5; and
a ratio of a height $I_{510}$ at a peak of approximately 510 $cm^{-1}$ to the height $I_{1350}$ at the peak of approximately 1350 $cm^{-1}$ satisfies approximately $0 < I_{510}/I_{1350} <$ approximately 12.

In another embodiment, this application provides a negative electrode, where the negative electrode includes a current collector and a coating on the current collector, and the coating includes:

silicon-based particles and graphite particles, where the silicon particles include:
a silicon oxide $SiO_x$, where x is 0.5 to 1.5;
a percentage of a quantity of silicon-based particles closely adjacent to the graphite particles in a total quantity of the silicon-based particles is greater than or equal to approximately 40%; and
a distance between the silicon-based particles and the adjacent graphite particles is less than or equal to approximately 500 nm.

In another embodiment, this application provides a negative electrode, where the negative electrode includes a current collector and a coating on the current collector, and the coating includes:

silicon-based particles and graphite particles, where the silicon particles include:
a silicon oxide $SiO_x$, where x is 0.5 to 1.5;
an X-ray diffraction pattern of the coating includes a [004] diffraction pattern and a [110] diffraction pattern, a ratio of a c-axis length C004 of a unit cell length acquired from the [004] diffraction pattern to an a-axis length C110 of a unit cell length acquired from the [110] diffraction pattern, C004/C110, is an orientation index (OI) value of the carbon coating, and the OI value satisfies approximately $7.5 < OI <$ approximately 18.

In another embodiment, this application provides a method for preparing a negative electrode material, where the method includes:

heating a silicon oxide $SiO_x$ to approximately 200° C. to 1500° C. in an inert gas atmosphere;
injecting a carbon source gas and heating the gas at approximately 200° C. to 1500° C. for approximately 30 min to 120 min to acquire solids; and
pulverizing and sieving the solids;
where x is 0.5 to 1.5.

In another embodiment, this application provides an electrochemical apparatus, including the negative electrode according to the embodiments of this application.

In another embodiment, this application provides an electronic apparatus, including the electrochemical apparatus according to the embodiments of this application.

In this application, characteristics of a silicon-based negative electrode active material (for example, values of $I_{1350}/I_{1580}$ and $I_{510}/I_{1350}$) are controlled, and a composition of the negative electrode is optimized, so that first efficiency, cycling performance, and rate performance of a lithium ion battery are improved.

Additional aspects and advantages of the embodiments of this application are partially described and presented in the subsequent description, or explained by implementation of the embodiments of this application.

BRIEF DESCRIPTION OF DRAWINGS

The accompanying drawings necessary for describing the embodiments of this application or the prior art are briefly explained below to facilitate the description of the embodiments of this application. Apparently, the accompanying drawings in the following description are merely some of the embodiments of this application. Those skilled in the art may still derive drawings of other embodiments from the structures illustrated in these drawings without creative efforts.

DETAILED DESCRIPTION OF EMBODIMENTS

Figure 1:
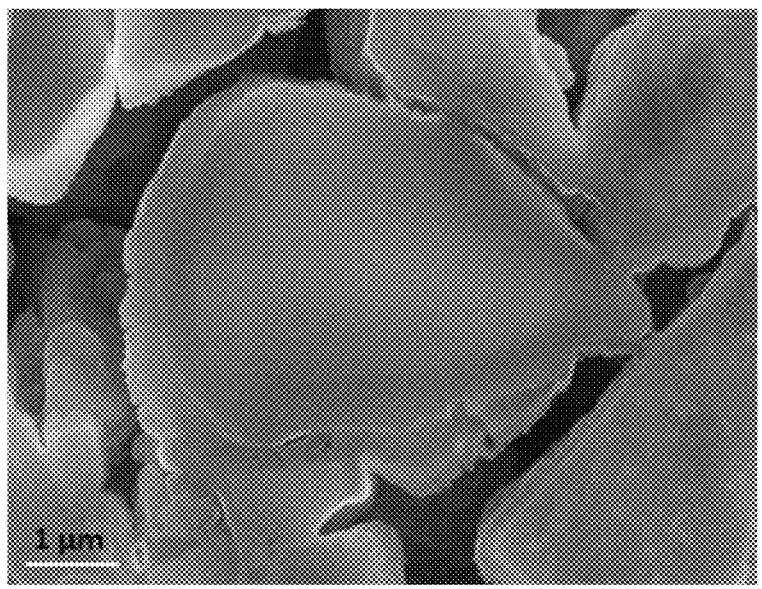
FIG. 1 shows a scanning electron microscope (SEM) image of a silicon-based negative electrode active material according to Embodiment 4 of this application.
Figure 2:
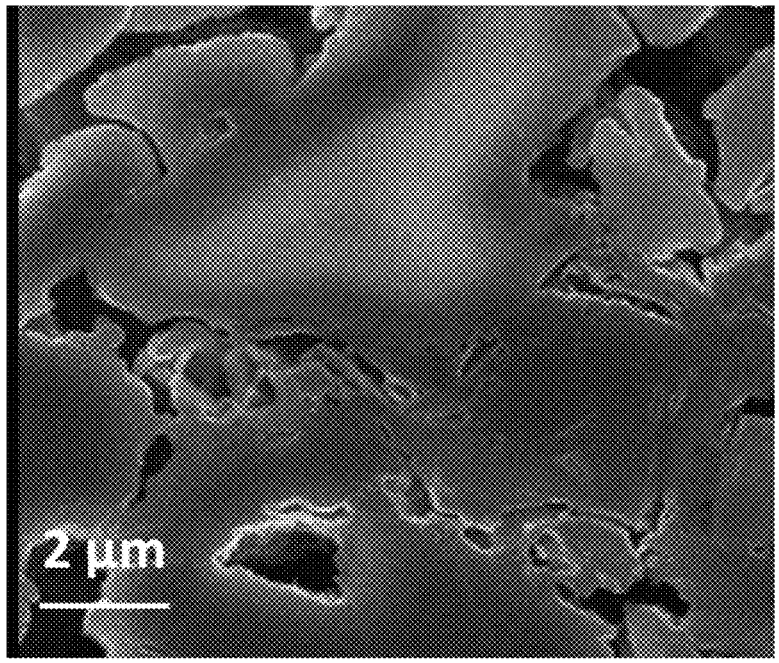
FIG. 2 shows an SEM image of a novel negative electrode according to Embodiment 1 of this application.
Figure 3:
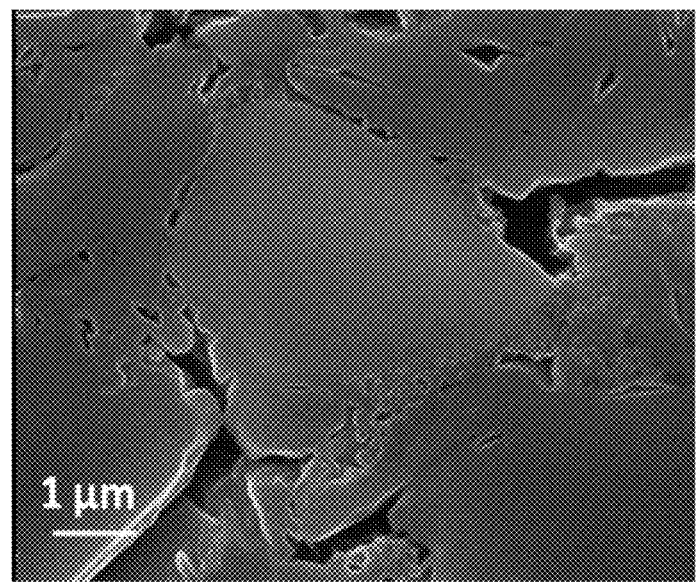
FIG. 3 shows an SEM image of a novel negative electrode according to Embodiment 3 of this application.
Figure 4:
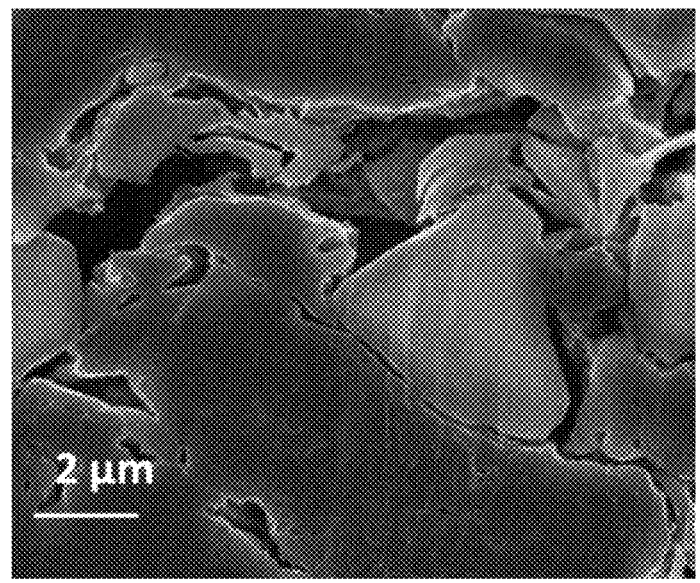
FIG. 4 shows an SEM image of a novel negative electrode according to Embodiment 5 of this application.

The embodiments of this application will be described in detail below. The embodiments of this application should not be construed as limitation to this application.

As used in this application, the term "approximately" is used to describe and explain minor changes. When used for an event or a circumstance, the term may refer to an example in which the exact event or circumstance occurs and an example in which an extremely approximate event or circumstance occurs. For example, when used for a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In addition, quantities, ratios, and other values are sometimes presented in a range format in this specification. It should be understood that such range formats are used for convenience and simplicity and should be flexibly understood as including not only values clearly designated as falling within the range but also all individual values or sub-ranges covered by the range as if each value and sub-range were clearly designated.

In specific embodiments and claims, a list of items corresponding to the term "one of" or other similar terms may mean any one of the items listed. For example, if items A and B are listed, the phrase "one of A and B" means only A or only B. In another example, if items A, B, and C are listed, the phrase "one of A, B, and C" means only A; only B; or only C. The item A may contain a single element or a plurality of elements. The item B may contain a single element or a plurality of elements. The item C may contain a single element or a plurality of elements.

In specific embodiments and claims, a list of items corresponding to the term "at least one of" or other similar terms may mean any combination of the items listed. For example, if items A and B are listed, the phrase "at least one of A and B" means only A; only B; or A and B. In another example, if items A, B, and C are listed, the phrase "at least one of A, B, and C" means only A; or only B; only C; A and B (excluding C); A and C (excluding B); B and C (excluding A); or A, B, and C. The item A may contain a single element or a plurality of elements. The item B may contain a single element or a plurality of elements. The item C may contain a single element or a plurality of elements.

I. Negative Electrode

In some embodiments, this application provides a negative electrode material. The negative electrode material includes silicon-based particles, where the silicon-based particles include: a silicon oxide $SiO_x$, where x is 0.5 to 1.6; and a carbon layer, where the carbon layer covers at least a portion of a surface of the silicon oxide $SiO_x$, and in a Raman spectrum, a ratio of a height $I_{1350}$ of the silicon-based particles at a peak of approximately 1350 $cm^{-1}$ to a height $I_{1580}$ at a peak of approximately 1580 $cm^{-1}$ satisfies approximately $0<I_{1350}/I_{1580}<$approximately 5, and a ratio of a height $I_{510}$ at a peak of approximately 510 $cm^{-1}$ to the height $I_{1350}$ at the peak of approximately 1350 $cm^{-1}$ satisfies approximately $0<I_{510}/I_{1350}<$approximately 12.

In some embodiment, this application provides a negative electrode. The negative electrode includes a current collector and a coating on the current collector, where the coating includes silicon-based particles, and the silicon-based particles include: a silicon oxide $SiO_x$, where x is 0.5 to 1.5; and a carbon layer, where the carbon layer covers at least a portion of a surface of the silicon oxide $SiO_x$, and in a Raman spectrum, a ratio of a height $I_{1350}$ of the silicon-based particles at a peak of approximately 1350 $cm^{-1}$ to a height $I_{1580}$ at a peak of approximately 1580 $cm^{-1}$ satisfies $0<I_{1350}/I_{1580}<5$, and a ratio of a height $I_{510}$ at a peak of approximately 510 $cm^{-1}$ to the height $I_{1350}$ at the peak of approximately 1350 $cm^{-1}$ satisfies $0<I_{510}/I_{1350}<12$.

In some embodiments, the coating further includes graphite particles, where a percentage of a quantity of silicon-based particles closely adjacent to the graphite particles in a total quantity of the silicon-based particles is greater than or equal to approximately 40%; and a distance between the silicon-based particles and the adjacent graphite particles is less than or equal to approximately 500 nm.

In some embodiments, this application provides a negative electrode. The negative electrode includes a current collector and a coating on the current collector, where the coating includes silicon-based particles and graphite particles, and the silicon-based particles include: a silicon oxide $SiO_x$, where x is 0.5 to 1.5; a percentage of a quantity of silicon-based particles closely adjacent to the graphite particles in a total quantity of the silicon-based particles is greater than or equal to approximately 40%; and a distance between the silicon-based particles and the adjacent graphite particles is less than or equal to approximately 500 nm.

In some embodiments, the silicon-based particles further include a carbon layer, and the carbon layer covers at least a portion of a surface of the silicon oxide $SiO_x$.

In some embodiments, an X-ray diffraction pattern of the coating includes a [004] diffraction pattern and a [110] diffraction pattern, a ratio of a c-axis length C004 of a unit cell length acquired from the [004] diffraction pattern to an a-axis length C110 of a unit cell length acquired from the [110] diffraction pattern, C004/C110, is an orientation index (OI) value of the carbon coating, and the OI value satisfies approximately $7.5<OI<$approximately 18.

In some embodiments, this application provides a negative electrode. The negative electrode includes a current collector and a coating on the current collector, where the coating includes silicon particles and graphite particles, and the silicon particles include a silicon oxide $SiO_x$, where x is 0.5 to 1.5, an X-ray diffraction pattern of the coating includes a [004] diffraction pattern and a [110] diffraction pattern, a ratio of a c-axis length C004 of a unit cell length acquired from the [004] diffraction pattern to an a-axis length C110 of a unit cell length acquired from the [110] diffraction pattern, C004/C110, is an OI value of the carbon coating, and the OI value satisfies approximately 7.5<OI<approximately 18.

In some embodiments, in a Raman spectrum, a ratio of a height $I_{1350}$ of the silicon-based particles at a peak of approximately 1350 cm$^{-1}$ to a height $I_{1580}$ at a peak of approximately 1580 cm$^{-1}$ satisfies approximately 0<$I_{1350}$/$I_{1580}$<approximately 5, and a ratio of a height $I_{510}$ at a peak of approximately 510 cm$^{-1}$ to the height $I_{1350}$ at the peak of approximately 1350 cm$^{-1}$ satisfies approximately 0<$I_{510}$/$I_{1350}$<approximately 12.

In some embodiments, a value of $I_{1350}$/$I_{1580}$ is approximately 1 to 4. In some embodiments, a value of $I_{1350}$/$I_{1580}$ is approximately 0.3, approximately 0.5, approximately 1, approximately 1.2, approximately 1.5, approximately 1.8, approximately 2.5, approximately 3, approximately 3.5, approximately 4.5, approximately 4.8, or within a range of any two of these values.

In some embodiments, a value of $I_{510}$/$I_{1350}$ is approximately 2 to 10. In some embodiments, a value of $I_{510}$/$I_{1350}$ is approximately 2.5, approximately 3, approximately 3.5, approximately 4, approximately 4.5, approximately 5, approximately 5.5, approximately 6, approximately 6.5, approximately 7, approximately 7.5, approximately 8, approximately 9, approximately 10, approximately 11, or within a range of any two of these values.

In some embodiments, the percentage of the quantity of silicon-based particles closely adjacent to the graphite particles in the total quantity of silicon-based particles is greater than or equal to approximately 40%. In some embodiments, the percentage of the quantity of silicon-based particles closely adjacent to the graphite particles in the total quantity of silicon-based particles is approximately 45%, approximately 50%, approximately 55%, approximately 60%, approximately 65%, approximately 70%, approximately 75%, approximately 80%, approximately 85%, approximately 90%, or within a range of any two of these values.

In some embodiments, that the silicon-based particles are closely adjacent to the graphite particles means that the distance between the silicon-based particles and the adjacent graphite particles is less than or equal to approximately 5 nm, or that the silicon-based particles are in direct contact with the adjacent graphite particles. In some embodiments, that the silicon-based particles are closely adjacent to the graphite particles means that the distance between the silicon-based particles and the graphite particles is less than or equal to approximately 4 nm, less than or equal to approximately 3 nm, or less than or equal to approximately 2 nm.

In some embodiments, the distance between the silicon-based particles and the adjacent graphite particles is less than or equal to approximately 500 nm. In some embodiments, the distance between the silicon-based particles and the adjacent graphite particles is less than or equal to approximately 400 nm, less than or equal to approximately 300 nm, less than or equal to approximately 200 nm, or less than or equal to approximately 100 nm.

In some embodiments, that the silicon-based particles are not closely adjacent to the graphite particles means that a distance between the silicon-based particles and the adjacent graphite particles is greater than approximately 5 nm.

In some embodiments, the OI value satisfies approximately 7.5<OI<approximately 18. In some embodiments, the OI value satisfies approximately 8<OI<approximately 15. In some embodiments, the OI value is approximately 9, approximately 10, approximately 11, approximately 12, approximately 13, approximately 14, approximately 15, approximately 16, approximately 17, or within a range of any two of these values.

In some embodiments, the silicon oxide $SiO_x$ includes SiO, $SiO_2$, nano-Si grains, or any combination thereof.

In some embodiments, a specific surface area of the silicon-based particles is approximately 2.5 m$^2$/g to 15 m$^2$/g. In some embodiments, a specific surface area of the silicon-based particles is approximately 5 m$^2$/g to 10 m$^2$/g. In some embodiments, a specific surface area of the silicon-based particles is approximately 3 m$^2$/g, approximately 4 m$^2$/g, approximately 6 m$^2$/g, approximately 8 m$^2$/g, approximately 10 m$^2$/g, approximately 12 m$^2$/g, approximately 14 m$^2$/g, or a range of any two of these values.

In some embodiments, a thickness of the carbon layer is approximately 3 nm to 40 nm. In some embodiments, a thickness of the carbon layer is approximately 5 nm to 35 nm. In some embodiments, a thickness of the carbon layer is approximately 10 nm, approximately 15 nm, approximately 20 nm, approximately 25 nm, approximately 30 nm, approximately 35 nm, or within a range of any two of these values.

In some embodiments, an average particle size of the silicon-based particles is approximately 500 nm to 30 μm. In some embodiments, an average particle size of the silicon-based particles is approximately 1 μm to 25 μm. In some embodiments, an average particle size of the silicon-based particles is approximately 5 μm, approximately 10 μm, approximately 15 μm, approximately 20 μm, or within a range of any two of these values.

In some embodiments, the current collection includes copper, aluminum, nickel, copper alloy, aluminum alloy, nickel alloy, or any combination thereof.

In some embodiments, a weight ratio of the silicon-based particles to the graphite particles is approximately 0.07 to 0.7. In some embodiments, a weight ratio of the silicon-based particles to the graphite particles is approximately 0.1 to 0.6. In some embodiments, a weight ratio of the silicon-based particles to the graphite particles is approximately 0.2, approximately 0.3, approximately 0.4, approximately 0.5, or within a range of any two of these values.

In some embodiments, the coating further includes a binder, where the binder includes polyacrylate, polyimide, polyamide, polyamide imide, polyvinylidene fluoride, styrene butadiene rubber, sodium alginate, polyvinyl alcohol, polytetrafluoroethylene, poly acrylonitrile, sodium carboxymethyl cellulose, potassium carboxymethyl cellulose, or any combination thereof.

In some embodiments, the coating further includes a conductive agent, where the conductive agent includes conductive carbon black, acetylene black, cochine black, conductive graphite, graphene, or any combination thereof.

In some embodiments, a peeling strength between the coating and the current collector is greater than or equal to approximately 20 N/m. In some embodiments, a peeling strength between the coating and the current collector is greater than or equal to approximately 30 N/m. In some embodiments, a peeling strength between the coating and the current collector is greater than or equal to approximately 50 N/m.

In some embodiments, this application provides a method for preparing a negative electrode material, where the method includes the following steps:

(1) Heat a silicon oxide $SiO_x$ to approximately 200° C. to 1500° C. in an inert gas atmosphere;

(2) Inject a carbon source gas and heat the gas at approximately 200° C. to 1500° C. for approximately 30 min to 120 min to acquire solids; and (3) Pulverize and sieve the solids;

where x is 0.5 to 1.5.

In some embodiments, a heating temperature is approximately 300° C. to 1200° C. In some embodiments, a heating temperature is approximately 350° C., approximately 400° C., approximately 500° C., approximately 600° C., approximately 700° C., approximately 800° C., approximately 900° C., approximately 1100° C., approximately 1200° C. approximately 1300° C., approximately 1400° C., or within a range of any two of these temperatures.

In some embodiments, a heating duration is approximately 40 min to 100 min. In some embodiments, a heating duration is approximately 50 min, approximately 60 min, approximately 70 min, approximately 80 min, approximately 90 min, approximately 100 min, approximately 110 min, or within a range of any two of these durations.

In some embodiments, an inert gas includes nitrogen, argon, helium, or any combination thereof.

In some embodiments, a carbon source gas includes $CH_4$, $C_2H_4$, $C_7H_8$, $C_2H_2$, $C_2H_2$, or any combination thereof.

In some embodiments, a negative electrode may be acquired by mixing the negative active material, a conductive material, and a binder in a solvent to prepare an active material composition and coating the active material composition on a current collector.

In some embodiments, the solvent may include, but is not limited to, N-methylpyrrolidone.

Silicon materials have a high theoretical gram capacity (4200 mAh/g) and have a wide application prospect in lithium-ion batteries. However, during a charge-discharge cycle, with intercalation and deintercalation of Li ions, the silicon material experiences a large volume change, causing the silicon-based material to be pulverized and detached from the current collector. This leads to poor conductivity of the negative electrode and reduces cycling performance of the lithium-ion batteries.

Currently, main methods to resolve the large volume change and poor conductivity in the cycling process of the silicon material are silicon material nanometerization, composition of silicon material and graphite or other materials (metal or non-metal), surface coating, and the like. Nano-silicon materials have a large specific surface area, which consumes more electrolyte to form a solid electrolyte interface (SEI) film, resulting in low first Coulomb efficiency. In addition, preparation of the nano-silicon materials is difficult and expensive. These problems limit further application of the nano-silicon materials. Carbon coating of the silicon materials can improve conductivity of the silicon negative electrode material and ease expansion, so it has been widely applied. However, raw material selection, thickness control, processing temperature, and the like of the carbon coating need to be further optimized and improved.

A peak of approximately 1350 $cm^{-1}$ of the silicon-based negative electrode active material in a Raman spectrum represents defective carbon. A higher peak indicates a higher content of the defective carbon. A peak of approximately 1580 $cm^{-1}$ represents non-defective carbon. A higher peak indicates a higher content of the non-defective carbon. A smaller value of $I_{1350}/I_{1580}$ indicates a higher proportion of non-defective carbon in the carbon layer covering a surface of silicon oxide $SiO_x$, that is, a higher graphitization degree of the carbon layer. A smaller value of $I_{1350}/I_{1580}$ indicates more hybrid carbon of $SP^2$ in the carbon layer, a smaller spacing of the carbon layer, more densification of the coating layer, a lower specific surface area, and higher first Coulomb efficiency.

Figure 5:
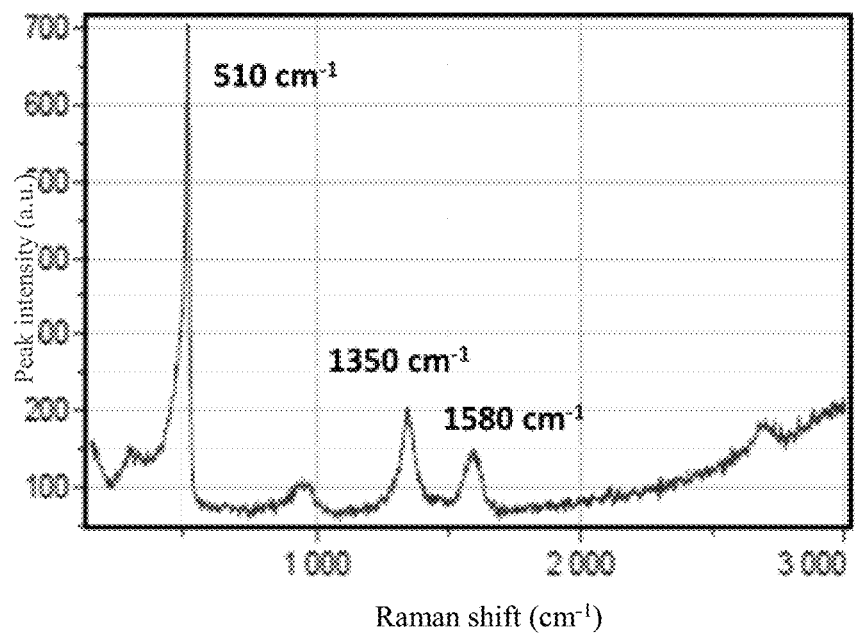
FIG. 5 shows a Raman spectrogram of a silicon-based negative electrode active material according to Embodiment 3 of this application.

FIG. 5 shows a Raman spectrogram of a silicon-based negative electrode active material according to Embodiment 3 of this application. It can be learned from FIG. 5 that the silicon-based negative electrode active material in Embodiment 3 has peaks at approximately 510 $cm^{-1}$, approximately 1350 $cm^{-1}$, and approximately 1580 $cm^{-1}$. It can be learned from FIGS. 1 to 4 that a larger value of $I_{1350}/I_{1580}$ indicates a smaller distance between the silicon-based particle and the graphite particle.

An $I_{510}$ value at a peak of 510 $cm^{-1}$ of the silicon-based negative electrode active material in the Raman spectrum represents Si. A larger value indicates a higher Si content. A smaller value of $I_{510}/I_{1350}$ indicates a thicker and more uniform carbon coating on the silicon oxide $SiO_x$ surface.

In some embodiments of this application, a silicon-based negative electrode active material is controlled to satisfy approximately $0<I_{1350}/I_{1580}<$approximately 5 and approximately $0<I_{510}/I_{1350}<$approximately 12, so that first efficiency, cycling performance, and rate performance of a lithium ion battery are improved.

When a mixture of the silicon-based negative electrode active material and the graphite is used as the negative electrode active material, if the distance between the silicon-based particles and the adjacent graphite particles is too large, the graphite particles are in poor contact with the silicon-based negative electrode active material in an initial stage, and electron transfer is obstructed, resulting in poor cycling performance. In some embodiments of this application, cycling performance of a lithium ion battery can be further improved by controlling the distance between the silicon-based particles and the adjacent graphite particles to be less than or equal to approximately 500 nm.

An X-ray diffraction pattern includes a [004] diffraction pattern and a [110] diffraction pattern, a ratio of a c-axis length C004 of a unit cell length acquired from the [004] diffraction pattern to an a-axis length C110 of a unit cell length acquired from the [110] diffraction pattern, C004/C110, is an orientation index (OI) value of the negative electrode.

A greater OI value indicates a smaller lithium intercalation surface exposed to the negative electrode, such that lithium ion intercalation is obstructed, resulting in poor rate performance. In some embodiments of this application, rate performance of the lithium ion battery can be further improved by controlling the OI value of the negative electrode to be within a range of approximately 7.5 to 18.

II. Positive Electrode

A material, a composition, and a manufacturing method of a positive electrode that can be used in the embodiments of this application include any technology disclosed in the prior art. In some embodiments, the positive electrode is the one described in U.S. patent application No. 9,812,739B, which is incorporated herein by reference in its entirety.

In some embodiments, the positive electrode includes a current collector and a positive electrode active material layer on the current collector.

In some embodiments, the positive electrode active material includes, but is not limited to, lithium cobalt ($LiCoO_2$), a lithium nickel cobalt manganese (NCM) ternary material, lithium ferrous phosphate ($LiFePO_4$), or lithium manganese ($LiMn_2O_4$).

In some embodiments, the positive electrode active material layer further includes a binder and optionally includes a conductive material. The binder enhances binding between particles of the positive electrode active material, and binding between the positive electrode active material and the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, polymers containing ethylene oxide, polyvinyl pyrrolidone, polyurethane, polytetrafluoroethylene, polyvinylidene-1,1-difluoroethylene, polyethylene, polypropylene, styrene-butadiene rubber, acrylic styrene-butadiene rubber, epoxy resin, nylon, or the like.

In some embodiments, the conductive material includes, but is not limited to, a carbon-based material, a metal-based material, a conductive polymer, and a mixture thereof. In some embodiments, the carbon-based material is selected from natural graphite, artificial graphite, carbon black, acetylene black, cochine black, carbon fiber, or any combination thereof. In some embodiments, the metal-based material is selected from metal powder, metal fiber, copper, nickel, aluminum, or silver. In some embodiments, the conductive polymer is a polyphenylene derivative.

In some embodiments, the current collector may include, but is not limited to, aluminum.

The positive electrode can be prepared according to a method known in the art. For example, the positive electrode can be acquired by using the following method: mixing the active material, the conductive material, and the binder in a solvent to prepare an active material composition, and coating the active material composition on the current collector. In some embodiments, the solvent may include, but is not limited to, N-methylpyrrolidone.

III. Electrolyte

The electrolyte used in the embodiments of this application may be any electrolyte known in the prior art.

In some embodiments, the electrolyte includes an organic solvent, a lithium salt, and an additive. The organic solvent of the electrolyte according to this application may be any organic solvent that is known in the prior art and that may be used as the solvent of the electrolyte. The electrolyte used in the electrolyte according to this application is not limited, and may be any electrolyte known in the art. The additive of the electrolyte according to this application may be any additive that is known in the prior art and that may be used as the additive of the electrolyte.

In some embodiments, the organic solvent includes, but is not limited to, ethylene carbonate (EC), propylene carbonate (PC), diethyl carbonate (DEC), ethyl methyl carbonate (EMC), dimethyl carbonate (DMC), propylene carbonate, or ethyl propionate.

In some embodiments, the lithium salt includes at least one of organic lithium salt or inorganic lithium salt.

In some embodiments, the lithium salt includes, but is not limited to, lithium hexafluorophosphate ($LiPF_6$), lithium tetrafluoroborate ($LiBF_4$), lithium difluorophosphate ($LiPO_2F_2$), lithium bistrifluoromethane sulfonimide LiN $(CF_3SO_2)_2$(LiTFSI), lithium bis (fluorosulfonyl) imide Li(N $(SO_2F)_2$)(LiFSI)), lithium bis(oxalato) borate $LiB(C_2O_4)_2$ (LiBOB), or lithium difluoroborate $LiBF_2(C_2O_4)$(LiDFOB).

In some embodiments, a concentration of lithium salt in the electrolyte is approximately 0.5 mol/L to 3 mol/L, approximately 0.5 mol/L to 2 mol/L, or approximately 0.8 mol/L to 1.5 mol/L.

IV. Separator

In some embodiments, a separator is provided between a positive electrode and a negative electrode to prevent short circuit. A material and a shape of the separator that may be used in the embodiments of this application are not particularly limited and may be any technique disclosed in the prior art. In some embodiments, the separator includes a polymer or an inorganic substance formed by a material stable to the electrolyte of this application.

For example, the separator may include a base material layer and a surface treatment layer. The base material layer is a non-woven fabric, membrane, or composite membrane having a porous structure, and a material of the base material layer is selected from at least one of polyethylene, polypropylene, polyethylene terephthalate, and polyimide. Specifically, a polypropylene porous membrane, a polyethylene porous membrane, polypropylene nonwoven fabric, polyethylene nonwoven fabric, or polypropylene-polyethylene-polypropylene porous composite membrane can be selected.

The surface treatment layer is provided on at least one surface of the base material layer, and the surface treatment layer may be a polymer layer or an inorganic layer, or may be a layer formed by a mixed polymer and an inorganic substance.

The inorganic layer includes inorganic particles and a binder. The inorganic particles are selected from one or a combination of aluminum oxide, silicon oxide, magnesium oxide, titanium oxide, hafnium oxide, tin oxide, ceria, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from one or a combination of polyvinylidene fluoride, vinylidene fluoride-hexafluoropropylene copolymer, polyamide, polyacrylonitrile, polyacrylate, polyacrylic acid, polyacrylate, polyvinylpyrrolidone, polyvinyl ether, polymethacrylate Ester, polytetrafluoroethylene, and polyhexafluoropropylene.

The polymer layer includes a polymer, and a material of the polymer is selected from at least one of polyamide, polyacrylonitrile, acrylate polymer, polyacrylic acid, polyacrylate, polyvinyl pyrrolidone, polyvinyl ether, polyvinylidene fluoride, or poly (vinylidene fluoride-hexafluoropropylene).

V. Electrochemical Apparatus

The embodiments of this application provide an electrochemical apparatus, where the electrochemical apparatus includes any apparatus for producing an electrochemical reaction.

In some embodiments, the electrochemical apparatus of this application includes: a positive electrode having a positive electrode active material capable of occluding and releasing metal ions; a negative electrode according to the embodiments of this application; an electrolytic solution; and a separator interposed between the positive electrode and the negative electrode.

In some embodiments, the electrochemical apparatus of this application includes, but is not limited to, all types of primary batteries, secondary batteries, fuel batteries, solar batteries, or capacitors.

In some embodiments, the electrochemical apparatus is a lithium secondary battery.

In some embodiments, the lithium secondary batteries include, but are not limited to, lithium metal secondary batteries, lithium ion secondary batteries, lithium polymer secondary batteries, or lithium ion polymer secondary batteries.

VI. Electronic Apparatus

The electronic apparatus of this application may be any apparatus that uses the electrochemical apparatus according to the embodiments of this application.

In some embodiments, the electronic apparatus includes, but is not limited to, a notebook computer, a pen-input computer, a mobile computer, an electronic book player, a portable telephone, a portable fax machine, a portable copier, a portable printer, a headset, a video recorder, a liquid crystal television, a portable cleaner, a portable CD player, a mini-disc, a transceiver, an electronic notebook, a calculator, a storage card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium ion capacitor, or the like.

The following uses a lithium ion battery as an example to describe preparation of a lithium ion battery with reference to specific embodiments. Persons skilled in the art will understand that the preparation methods described in this application are merely examples, and any other suitable preparation methods are within the scope of this application.

EMBODIMENTS

The following describes performance evaluation of the embodiments and reference embodiments of the lithium ion battery according to this application.

I. Test Methods

1. Raman test: Raman spectrometry adopts Jobin Yvon LabRAM HR spectrometer with a light source of 532 nm and a test range of 300 cm$^{-1}$ to 2000 cm$^{-1}$.

2. Scanning electron microscope (SEM) test: Characterization of the scanning electron microscope is recorded using PhilipsXL-30 field emission scanning electron microscope and is tested under conditions of 10 kV and 10 mA.

3. Transmission electron microscope (TEM) test: TEM is used to test a coating thickness. Characterization of transmission electron microscope is carried out on JEOL JEM-2010 transmission electron microscope of Japan Electron Optics Laboratory at an operating voltage of 200 kV.

4. OI value test: According to the People's Republic of China Machinery Industry Standard JB/T 4220-2011 Determination of Lattice Parameters of Artificial Graphite, a [004] diffraction pattern and a [110] diffraction pattern in an X-ray diffraction pattern of a carbon coating in a negative electrode are tested. Test conditions are as follows: X-rays are emitted through CuK$_\alpha$ radiation, and the CuK$_\alpha$ radiation is removed by a filter or a monochromator. A working voltage of an X-ray tube is (30-35) kV, and a working current is 15 mA to 20 mA. A scanning speed of a counter is ¼(°)/min. When the [004] diffraction pattern is recorded, a scanning range of a diffraction angle 2θ is 53° to 57°. When the [110] diffraction pattern is recorded, a scanning range of a diffraction angle 2θ is 75° to 79°. A c-axis length of a unit cell length acquired from the [004] diffraction pattern is recorded as C004. An a-axis length of a unit cell length acquired from the [110] diffraction pattern is recorded as C110. Calculate an OI value according to the following formula:

$$OI\ value = C004/C110$$

5. SEM test method in a closely adjacent state: The SEM test method for calculating a percentage (hereinafter referred to as "$R_1$") of a quantity of silicon-based particles closely adjacent to graphite particles in a total quantity of the silicon-based particles is as follows:

Select five different ranges of 100 μm×100 μm from an SEM image of the negative electrode; in each range of 100 μm×100 μm, define a distance between the silicon-based particles and the adjacent graphite particles of less than or equal to approximately 5 nm as a closely adjacent state; and calculate a percentage of a quantity of silicon-based particles in the closely adjacent state in the five 100 μm×100 μm ranges in a total quantity of the silicon-based particles in the five 100 μm×100 μm ranges.

6. SEM test method in a non-closely adjacent state: The SEM test method for calculating a maximum distance between silicon-based particles and adjacent graphite particles (hereinafter referred to as $D_m$) in the non-closely adjacent state is as follows:

Select five different ranges of 100 μm×100 μm from an SEM image of the negative electrode; in each range of 100 μm×100 μm, define a distance between the silicon-based particles and the adjacent graphite particles of greater than approximately 5 nm as a non-closely adjacent state; measure a maximum distance between the silicon-based particles and the adjacent graphite particles in the non-closely adjacent state in each range of 100 μm×100 μm; and calculate an average value of the maximum distances between the silicon-based particles in the five ranges of 100 μm×100 μm, and use the value as the maximum distance between silicon-based particles and the adjacent graphite particles in the non-closely adjacent state.

7. Negative electrode binding power test: Use a tensile tester to measure a binding power of the silicon-based negative electrode; cut the negative electrode into a size of 15 mm×2 mm; stick the negative electrode to a stainless steel plate through 3 M double-sided tape; and place it on the tensile tester to test the negative electrode binding power.

8. Specific surface area test: At a constant temperature and a low temperature, after measuring amounts of gas adsorbed on a solid surface at different relative pressures, find an amount of sample monolayer adsorption according to the Brownor-Ett-Taylor adsorption theory and its formula (BET formula), to calculate a specific surface area of the solid.

Weigh approximately 1.5 g to 3.5 g powder sample, put the sample into a TriStar II 3020 test sample tube, degas at approximately 200° C. for 120 min, and then perform the test.

9. Cycling performance test: A test temperature is 25° C. Charge to 4.45 V in a constant current at a rate of 0.5 C; charge to 0.025 C at a constant voltage; and discharge to 3.0 V at a rate of 0.5 C after standing for 5 minutes. A capacity acquired in this step is an initial capacity. A 0.5 C charge/0.5 C discharge cycling test is performed, and a capacity attenuation curve is acquired by taking a ratio of a capacity of each step to the initial capacity.

10. Rate performance test: A test temperature is 25° C. Charge to 4.45 V in a constant current at a rate of 0.5 C; charge to 0.025 C at a constant voltage; and discharge to 3.0 V at a rate of 0.2 C after standing for 5 minutes. A capacity acquired in this step is an initial capacity. Perform 0.5 C charge and 2 C discharge. A ratio of 2 C discharge capacity to 0.2 C capacity is rate performance.

11. First efficiency test: Charge to 4.45 V in a constant current at a rate of 0.5 C, and further charge to a current lower than 0.025 C at a constant voltage of 4.45 V to acquire a charging capacity CO of the lithium ion battery; after standing for 5 minutes, discharge to 3.0 V in a constant current at a rate of 0.5 C, to acquire a discharge capacity DO of the lithium ion battery, where DO/CO is the first Coulomb efficiency of the lithium ion battery.

II. Preparation of Lithium-Ion Battery

Preparation of Positive Electrode

Evenly mix LiCoO$_2$, conductive carbon black, and polyvinylidene fluoride (PVDF) in a N-methylpyrrolidone solvent system at a weight ratio of approximately 96.7%, 1.7%, and 1.6% to prepare a positive electrode slurry. Coat the prepared positive electrode slurry on a positive electrode current collector aluminum foil, and perform drying and cold pressing on the slurry to acquire a positive electrode.

Preparation of Negative Electrode (1) In an MSK-SFM-10 vacuum stirrer, add 400 g of silicon-based negative electrode active material prepared according to the following embodiments and reference embodiments, 2400 g of graphite and 50 g of conductive agent (conductive carbon black, Super P®), and stir for 120 minutes to acquire a mixture, where a revolution speed is 10 r/min to 30 r/min;

(2) Add 100 g of binder (polyacrylate) to the mixture acquired in (1), stir for 60 min to disperse evenly, add deionized water, and stir for 120 min to acquire mixed slurry, where a revolution speed is 10 r/min to 30 r/min, and a rotation speed is 1000 r/min to 1500 r/min;

(3) Filter the slurry acquire in (2) with a 170-mesh double-layer screen to acquire negative electrode slurry, where viscosity of the negative electrode slurry is controlled between 2500 mPa·S to 4000 mPa·S, and a solid content is controlled at 35% to 50%; and (4) Coat the negative electrode slurry acquired in (3) on a copper foil current collector with a coating thickness of 50 μm to 200 μm; and perform drying and cool pressing on the negative electrode, where a double-sided compaction density is 1.3 g/cm$^3$ to 2.0 g/cm$^3$.

Preparation of an Electrolyte

In a dry argon atmosphere, add $LiPF_6$ into a solvent mixed with propylene carbonate (PC), ethylene carbonate (EC), and diethyl carbonate (DEC) (with a weight ratio of approximately 1:1:1), and mix well, where a concentration of $LiPF_6$ is approximately 1 mol/L; and then add approximately 10 wt % of fluoroethylene carbonate (FEC) and mix evenly to acquire an electrolyte.

Preparation of Separator

Use a PE porous polymer film as a separator.

Preparation of Lithium-Ion Battery

Stack the positive electrode, the separator, and the negative electrode in order, so that the separator is placed between the positive and negative electrodes for isolation, and perform winding to acquire a bare battery. Place the bare battery in an outer package, inject the electrolyte, and perform encapsulation. Perform forming, degassing, trimming, and other processes to acquire a lithium ion battery.

III. Preparation of Negative Electrode Active Material

1. Prepare the silicon-based negative active material of Embodiment 1 as follows:

(1) Place approximately 2 kg of a commercial silicon oxide $SiO_x$ (0.5<X<1.6, D50=approximately 5.5 μm) powder on a fluidized bed baffle; and inject Ar at a room temperature for approximately 3 hours to remove the air in a furnace cavity, where a gas flow rate is approximately 200 ml/min;

(2) After the air in the furnace is exhausted, raise a temperature to approximately 400° C. at a heating rate of approximately 20° C./min. After 10 minutes, inject a carbon source gas $CH_4$ (a gas flow rate is approximately 300 ml/min); and cut off $CH_4$ gas immediately after keeping at approximately 400° C. for approximately 60 min; and (3) Lower the temperature to the room temperature in the Ar atmosphere, take out the powder sample after cooling, and finally sieve using a 400-mesh screen to acquire the silicon-based negative electrode active material.

The preparation methods of the silicon-based negative electrode active materials of Embodiments 2 to 10 and Reference Embodiments 2 to 5 are similar to those of Embodiment 1, except that the heating temperature and duration and the carbon source gas are different. For the specific temperature and duration and carbon source gas, see Table 1. The silicon-based negative electrode active material in Reference Embodiment 1 is the silicon oxide $SiO_x$ (0.5<X<1.6, D50=approximately 5.5 μm) itself, that is, it is not coated.

TABLE 1

| No. | Heating temperature (° C.) | Heating duration (min) | Carbon source gas |
|---|---|---|---|
| Embodiment 1 | 400 | 60 | $CH_4$ |
| Embodiment 2 | 700 | 60 | $CH_4$ |
| Embodiment 3 | 800 | 60 | $CH_4$ |
| Embodiment 4 | 900 | 60 | $CH_4$ |
| Embodiment 5 | 1000 | 60 | $CH_4$ |
| Embodiment 6 | 800 | 60 | $C_2H_4$ |
| Embodiment 7 | 800 | 60 | $C_7H_8$ |
| Embodiment 8 | 800 | 60 | $CH_4:C_2H_4 = 1:2$ (volume ratio) |
| Embodiment 9 | 800 | 60 | $CH_4:C_2H_4 = 2:1$ (volume ratio) |
| Embodiment 10 | 800 | 90 | $CH_4$ |
| Reference Embodiment 1 | — | — | — |
| Reference Embodiment 2 | 800 | 30 | $CH_4$ |
| Reference Embodiment 3 | 800 | 120 | $CH_4$ |
| Reference Embodiment 4 | 300 | 60 | $CH_4$ |
| Reference Embodiment 5 | 1100 | 60 | $C_2H_4$ |

Table 2 shows properties of the negative electrode and performance test results of the lithium ion battery in Embodiments 1 to 10 and Reference Embodiments 1 to 5.

TABLE 2

| No. | $I_{1350}/I_{1580}$ | $I_{510}/I_{1350}$ | Carbon layer thickness (nm) | Specific surface area (m$^2$/g) | Negative electrode OI value | $R_1$ | $D_m$ (nm) | Negative electrode binding power (N/m) | First time Efficiency | Capacity retention rate at 400 cycles (25° C.) | Rate Performance |
|---|---|---|---|---|---|---|---|---|---|---|---|
| Embodiment 1 | 4.5 | 9.5 | 8 | 13.4 | 7.6 | 80% | 400 | 60 | 82.1% | 86.1% | 90% |
| Embodiment 2 | 4.0 | 8.3 | 8 | 9.1 | 8.0 | 60% | 400 | 57 | 83.3% | 86.7% | 89.8% |
| Embodiment 3 | 2.0 | 6.2 | 8 | 4.1 | 9.8 | 50% | 450 | 60 | 87.8% | 93.7% | 89.4% |
| Embodiment 4 | 1.8 | 5 | 8 | 3.2 | 10.5 | 45% | 460 | 58 | 89.1% | 92.4% | 87.3% |
| Embodiment 5 | 1.5 | 4.8 | 8 | 2.9 | 11.2 | 44% | 500 | 61 | 89.3% | 88% | 87.0% |
| Embodiment 6 | 0.4 | 2.3 | 8 | 1.69 | 14.1 | 40% | 500 | 58 | 90.2% | 85.3% | 86.0% |
| Embodiment 7 | 1.0 | 3.5 | 8 | 2.1 | 13.6 | 40.5% | 500 | 59 | 89.9% | 86.2% | 86.7% |
| Embodiment 8 | 1.2 | 3.9 | 8 | 2.31 | 12.1 | 41.7% | 500 | 62 | 89.5% | 86.8% | 86.8% |
| Embodiment 9 | 1.3 | 4.2 | 8 | 2.45 | 11.8 | 43.8% | 500 | 61 | 89.1% | 87.3% | 86.9% |
| Embodiment 10 | 2.0 | 5.8 | 12 | 4.6 | 9.8 | 50% | 450 | 60 | 88.3% | 93.1% | 88.2% |
| Reference Embodiment 1 | — | — | 0 | 1.31 | 7.6 | 40% | 550 | 59 | 80.0% | 82.6% | 80.1% |

TABLE 2-continued

| No. | $I_{1350}/I_{1580}$ | $I_{510}/I_{1350}$ | Carbon layer thickness (nm) | Specific surface area (m²/g) | Negative electrode OI value | $R_1$ | $D_m$ (nm) | Negative electrode binding power (N/m) | First time Efficiency | Capacity retention rate at 400 cycles (25° C.) | Rate Performance |
|---|---|---|---|---|---|---|---|---|---|---|---|
| Reference Embodiment 2 | 2.0 | 14.2 | 3 | 2.9 | 9.8 | 50% | 500 | 60 | 83.2% | 83.6% | 88.2% |
| Reference Embodiment 3 | 2.0 | 0.8 | 16 | 6.8 | 9.8 | 50% | 450 | 60 | 88.6% | 90.1% | 82.4% |
| Reference Embodiment 4 | 5.8 | 10.2 | 8 | 15.8 | 7.3 | 80% | 450 | 60 | 81.0% | 79.0% | 90.1% |
| Reference Embodiment 5 | 0.2 | 2.0 | 8 | 1.43 | 19.2 | 35% | 550 | 59 | 90.5% | 83.3% | 81.2% |

It can be learned from the test results of Embodiments 1 to 10 and Reference Embodiments 1 to 5 that the carbon layer covering the silicon oxide $SiO_x$ surface can significantly improve first Coulomb efficiency and cycling performance of lithium ion batteries. Carbon coating reduces direct contact of the silicon oxide $SiO_x$ with the electrolyte, thereby improving the first Coulomb efficiency. Furthermore, the carbon coating can alleviate stress generated by expansion of the silicon oxide $SiO_x$ in a lithium intercalation/de-intercalation cycle and reduce silicification of the silicon-based material caused by the expansion. The carbon coating can also improve conductivity of the silicon-based negative electrode active material, and alleviate corrosion of the silicon oxide by HF, thereby improving the cycling performance.

It can also be learned that when the silicon-based negative electrode active material satisfies any one of the following conditions: (1) approximately $0<I_{1350}/I_{1580}<$approximately 5, and approximately $0<I_{510}/I_{1350}<$approximately 12; (2) $R_1$ is greater than or equal to approximately 40%; (3) $D_m$ is less than or equal to approximately 500 nm; and (4) approximately $7.5<OI<$approximately 18, the lithium ion battery prepared therefrom can acquire higher first efficiency, cycling performance, and/or rate performance. When the silicon-based negative electrode active material satisfies all of the above-mentioned four conditions, the first time efficiency, cycling performance, and rate performance are better.

Figure 6:
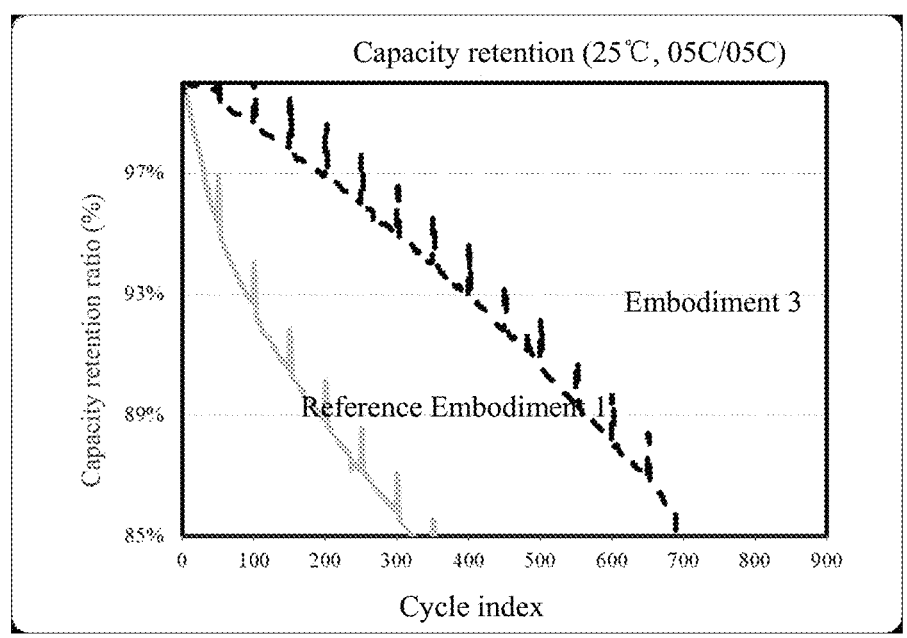
FIG. 6 shows a cycle curve of a lithium ion battery according to Embodiment 3 and Reference Embodiment 1 of this application.

FIG. 6 shows a cycle curve of a lithium ion battery according to Embodiment 3 and Reference Embodiment 1 of this application. It can be learned that the cycling performance of the lithium ion battery in Embodiment 3 is obviously better than that of the lithium ion battery of Reference Embodiment 1.

Reference to "some embodiments", "an embodiment", "another example", "examples", "specific examples", or "some examples" in the specification is intended to include specific features, structures, materials, or characteristics described in the embodiment or example in at least one embodiment or example of this application. Accordingly, descriptions appearing in the specification, such as "in some embodiments", "in the embodiments", "in an embodiment", "in another example", "in an example", "in a particular example", or "for example", are not necessarily references to the same embodiments or examples in this application. In addition, specific features, structures, materials, or characteristics herein may be incorporated in any suitable manner into one or more embodiments or examples.

Although illustrative embodiments have been demonstrated and described, those skilled in the art should understand that the above embodiments are not to be construed as limiting this application, and that the embodiments may be changed, replaced, and modified without departing from the spirit, principles, and scope of this application.

What is claimed is:

1. A negative electrode material, wherein the negative electrode material comprises silicon-based particles, and the silicon-based particles comprise:
   a silicon oxide $SiO_x$, wherein x is 0.5 to 1.6; and
   a carbon layer, wherein the carbon layer covers at least a portion of a surface of the silicon oxide $SiO_x$;
   wherein in a Raman spectrum, a ratio of a height $I_{1350}$ of the silicon-based particles at a peak of 1350 cm$^{-1}$ to a height $I_{1580}$ at a peak of 1580 cm$^{-1}$ is $0<I_{1350}/I_{1580}<5$; and
   a ratio of a height $I_{510}$ at a peak of 510 cm$^{-1}$ to the height $I_{1350}$ at the peak of 1350 cm$^{-1}$ is $2.3<I_{510}/I_{1350}<12$.

2. The negative electrode material according to claim 1, wherein the silicon oxide $SiO_x$ comprises SiO, $SiO_2$, nano-Si grains, or any combination thereof.

3. The negative electrode material according to claim 1, wherein a specific surface area of the silicon-based particles is 2.5 m²/g to 15 m²/g.

4. The negative electrode material according to claim 1, wherein a thickness of the carbon layer is 3 nm to 40 nm.

5. The negative electrode material according to claim 1, wherein an average particle size of the silicon-based particles is 500 nm to 30 μm.

6. A negative electrode, wherein the negative electrode comprises a current collector and a coating on the current collector, and the coating comprises silicon-based particles;
   wherein the silicon-based particles comprise:
      a silicon oxide $SiO_x$, wherein x is 0.5 to 1.5;
      wherein the silicon-based particles further comprise a carbon layer, wherein the carbon layer covers at least a portion of a surface of the silicon oxide $SiO_x$; and
      wherein in a Raman spectrum, a ratio of a height $I_{510}$ at a peak of 510 cm$^{-1}$ to the height $I_{1350}$ at the peak of 1350 cm$^{-1}$ is $2.3<I_{510}/I_{1350}<12$.

7. The negative electrode according to claim 6, wherein in the Raman spectrum, a ratio of a height $I_{1350}$ of the silicon-based particles at a peak of 1350 cm$^{-1}$ to a height $I_{1580}$ at a peak of 1580 cm$^{-1}$ is $0<I_{1350}/I_{1580}<5$.

8. The negative electrode according to claim 6, wherein the current collector comprises copper, aluminum, nickel, copper alloy, aluminum alloy, nickel alloy, or any combination thereof.

9. The negative electrode according to claim 6, wherein an X-ray diffraction pattern of the coating comprises a [004] diffraction pattern and a [110] diffraction pattern, a ratio of a c-axis length C004 of a unit cell length acquired from the [004] diffraction pattern to an a-axis length C110 of a unit cell length acquired from the [110] diffraction pattern, C004/C110, is an orientation index (OI) value of the coating, and the OI value is 7.5<OI<18.

10. The negative electrode according to claim 6, wherein a specific surface area of the silicon-based particles is 2.5 m²/g to 15 m²/g.

11. The negative electrode according to claim 6, wherein the coating further comprises a binder, wherein the binder comprises polyacrylate, polyimide, polyamide, polyamide imide, polyvinylidene fluoride, styrene butadiene rubber, sodium alginate, polyvinyl alcohol, polytetrafluoroethylene, polyacrylonitrile, sodium carboxymethyl cellulose, potassium carboxymethyl cellulose, or any combination thereof.

12. The negative electrode according to claim 6, wherein a peeling strength between the coating and the current collector is greater than or equal to 20 N/m.

13. The negative electrode according to claim 6, wherein the coating further comprises graphite particles, wherein
- a percentage of a quantity of silicon-based particles adjacent to the graphite particles in a total quantity of the silicon-based particles is greater than or equal to 40%; and
- a distance between the silicon-based particles and the adjacent graphite particles is less than or equal to 500 nm.

14. The negative electrode according to claim 13, wherein a weight ratio of the silicon-based particles to the graphite particles is 0.07 to 0.7.

15. The negative electrode according to claim 13, wherein a thickness of the carbon layer is 3 nm to 40 nm.

16. The negative electrode according to claim 13, wherein an X-ray diffraction pattern of the coating comprises a [004] diffraction pattern and a [110] diffraction pattern, a ratio of a c-axis length C004 of a unit cell length acquired from the [004] diffraction pattern to an a-axis length C110 of a unit cell length acquired from the [110] diffraction pattern, C004/C110, is an orientation index (OI) value of the carbon coating, and the OI value is 7.5<OI<18.

17. The negative electrode according to claim 13, wherein, in the Raman spectrum, a ratio of a height $I_{1350}$ of the silicon-based particles at a peak of 1350 cm$^{-1}$ to a height $I_{1580}$ at a peak of 1580 cm$^{-1}$ is $0<I_{1350}/I_{1580}<5$.

18. A method of preparing the negative electrode material according to claim 1, wherein the method comprises:
- heating the silicon oxide SiO$_x$ to 200° C. to 1500° C. in an inert gas atmosphere;
- injecting a carbon source gas and heating the gas at 200° C. to 1500° C. for 30 min to 120 min to acquire solids; and
- pulverizing and sieving the solids.

\* \* \* \* \*